Dec. 6, 1966 A. V. KLANCNIK 3,289,884
VIBRATORY HOPPER WITH ATTACHED ARTICLE GUIDE MEANS
POSITIONABLE ADJACENT A VERTICAL MAGAZINE MEANS
Filed Sept. 29, 1964 6 Sheets-Sheet 1

Inventor
Adolph V. Klancnik
By Wallace, Kinzer and Dorn
Attorneys

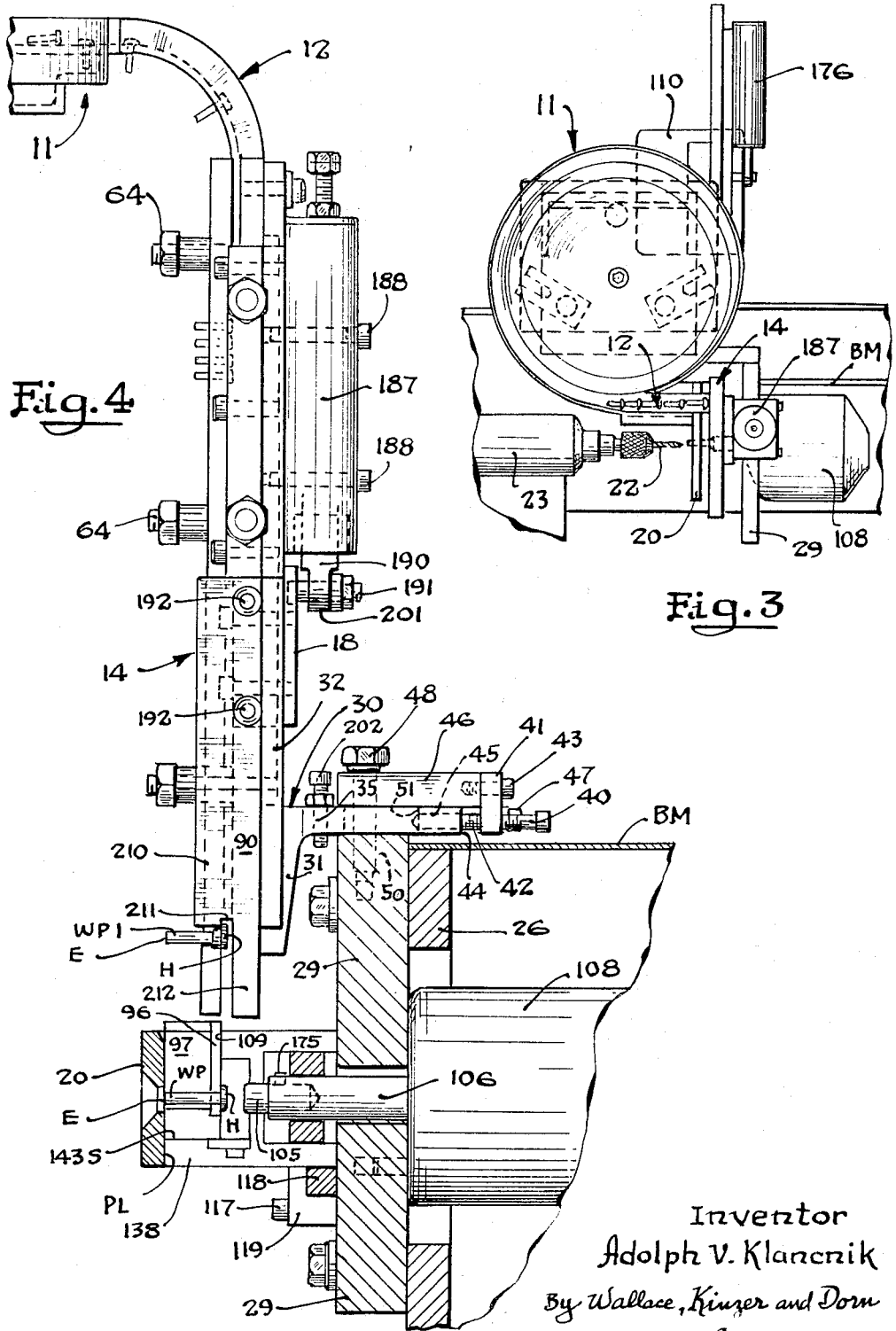

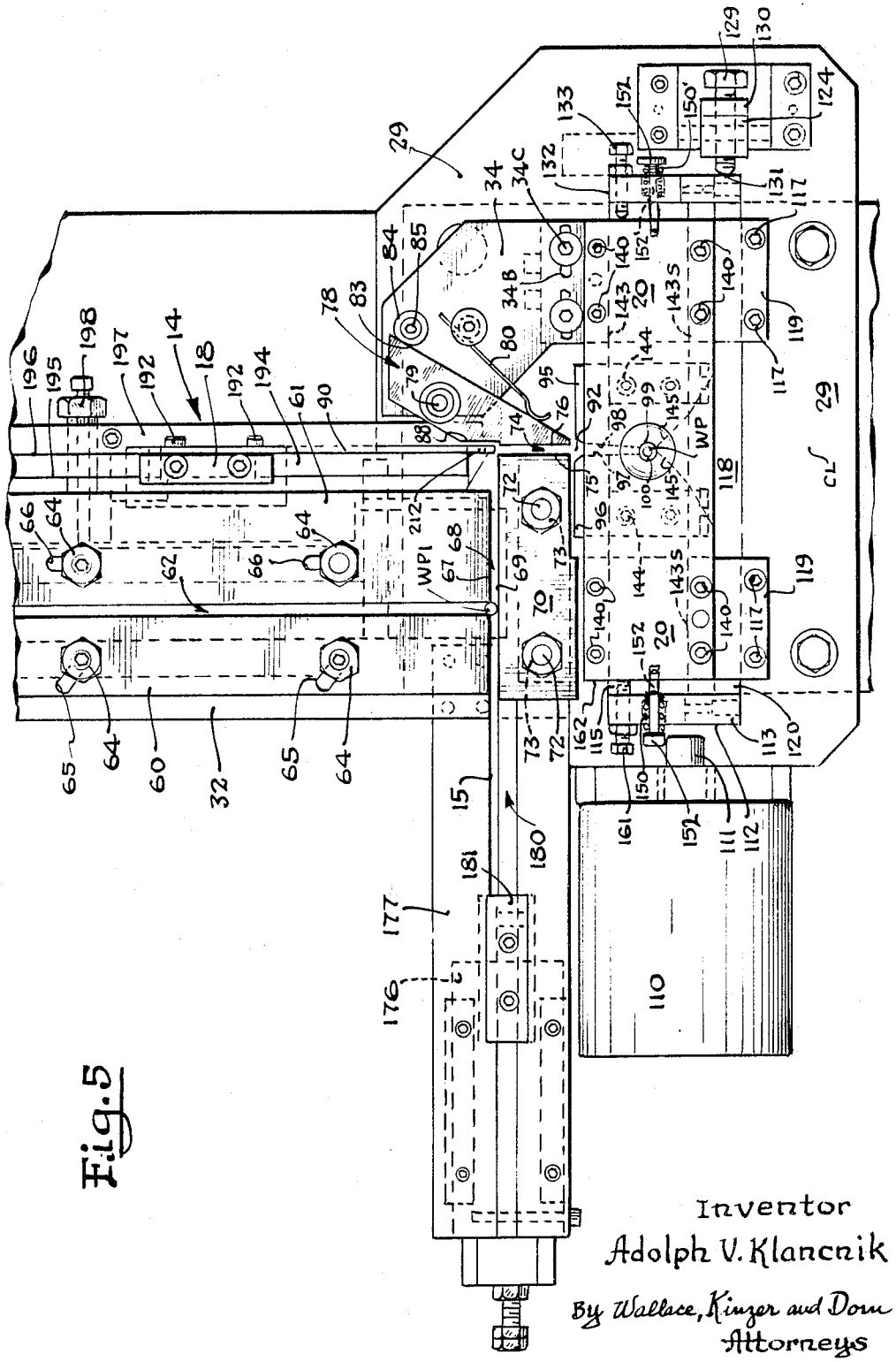

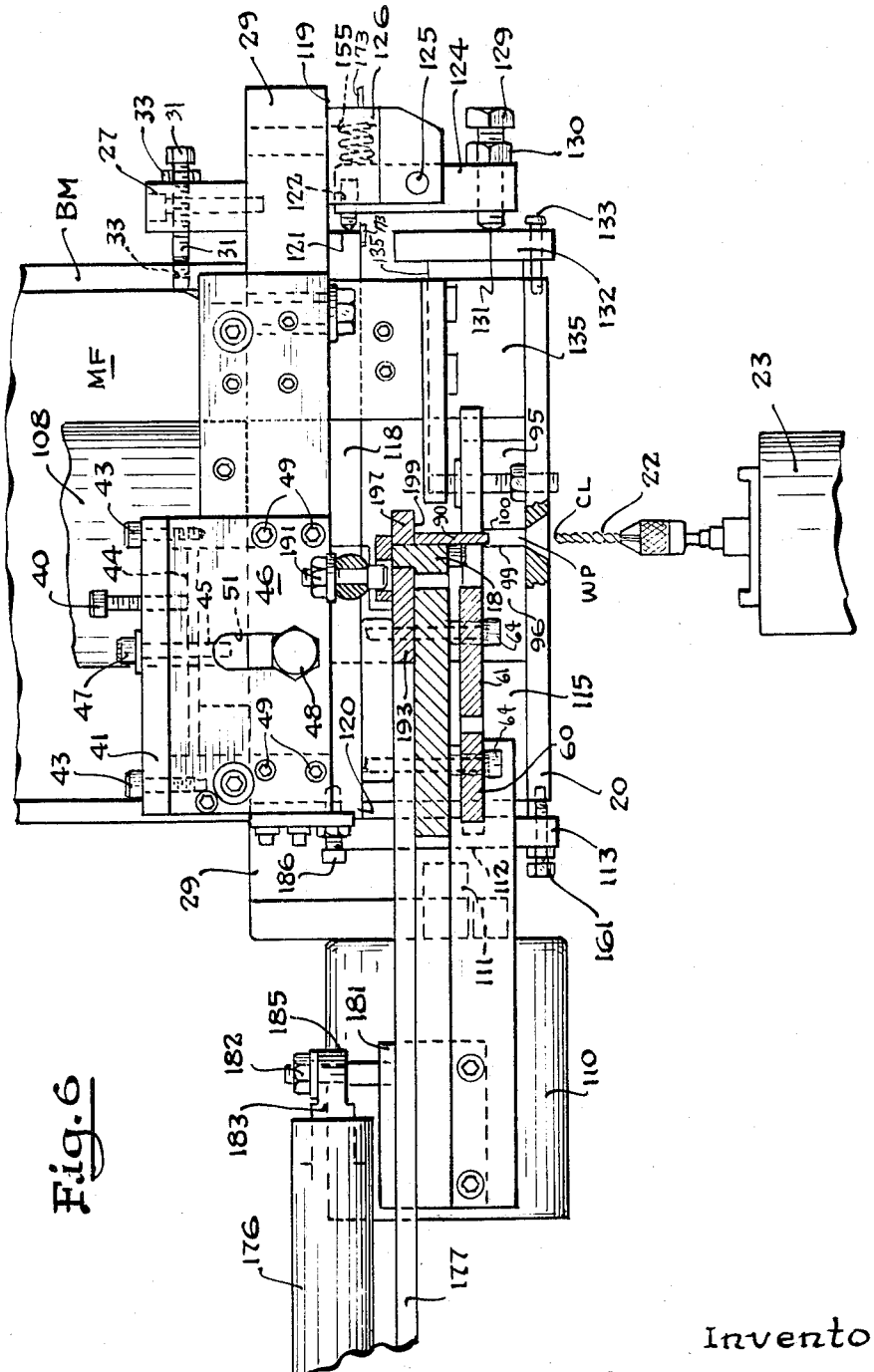

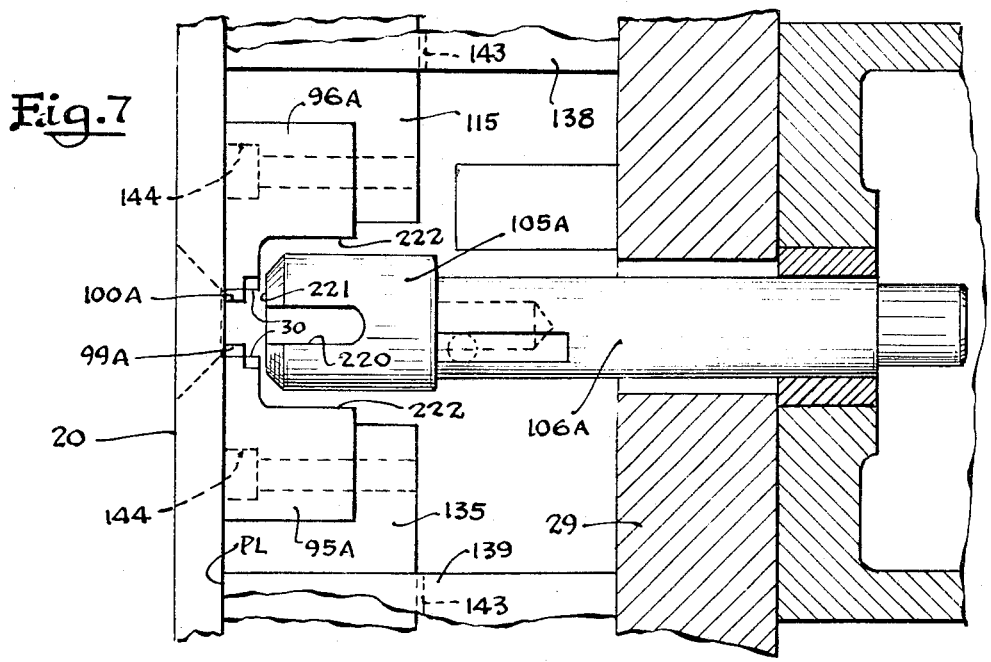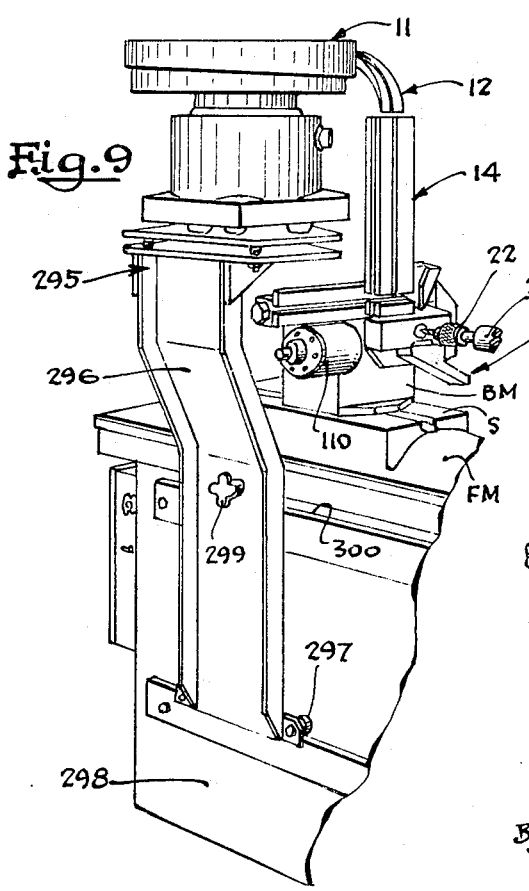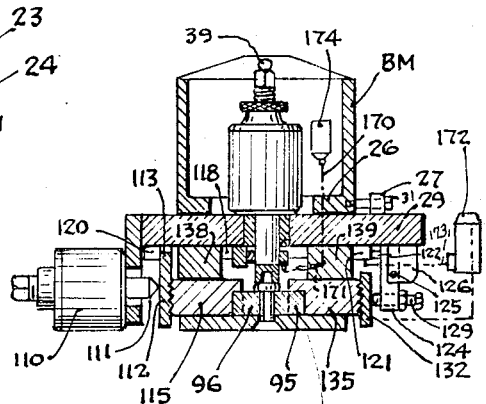

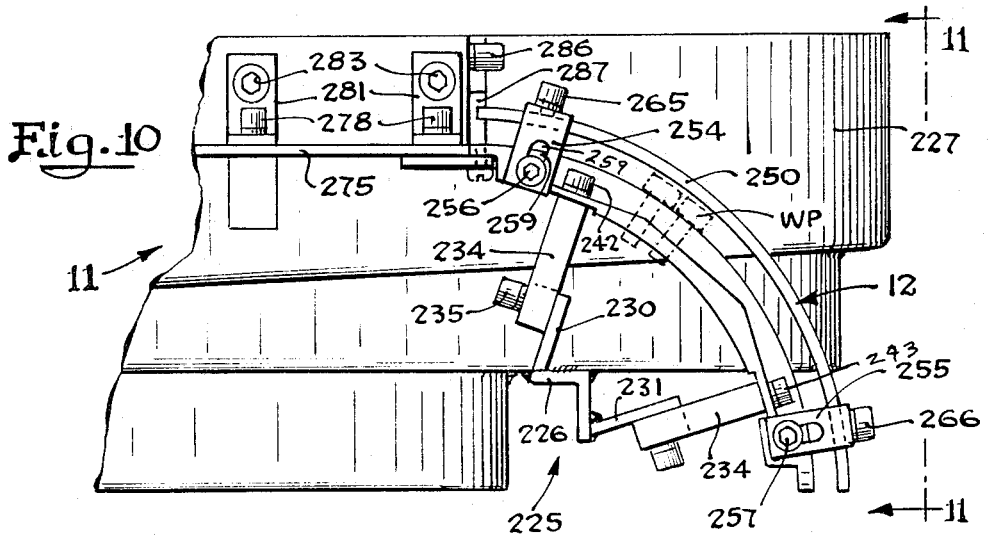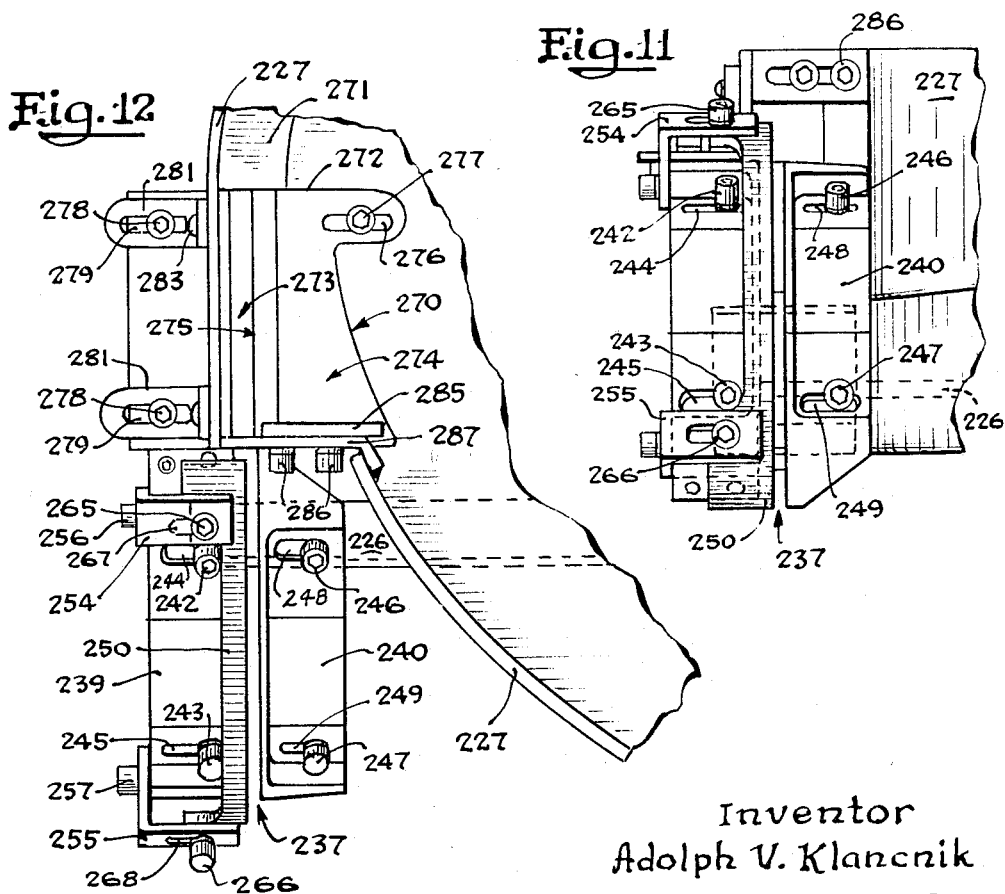

United States Patent Office 3,289,884
Patented Dec. 6, 1966

3,289,884
VIBRATORY HOPPER WITH ATTACHED ARTICLE GUIDE MEANS POSITIONABLE ADJACENT A VERTICAL MAGAZINE MEANS
Adolph V. Klancnik, 1020 Glenview Road, Glenview, Ill.
Filed Sept. 29, 1964, Ser. No. 400,126
1 Claim. (Cl. 221—178)

This invention relates generally to automatic machine tools, and in particular to those which incorporate a magazine for automatically feeding work pieces to a work station.

The present invention is concerned with an automatic machine tool for performing any one of a number of machining operations such as drilling, reaming, tapping, countersinking or the like on relatively small, generally cylindrical work pieces such as rivets, studs and spacers used in the assembly of mechanical components. Work pieces of this character may vary widely in overall configuration, and are generally produced at a fast rate and in great numbers. These considerations are for the most part a manifestation of industrial miniaturization.

It is found that the general classification of machine tools adaptable to production requirements dictated by the needs for miniaturization does not possess that degree of flexibility manifest in a magazine feed capable of handling variously shaped and relatively small work pieces. Accordingly, an object of the present invention is to construct an automatic workpiece feeding mechanism capable of being readily adapted to accept numerous changes in size and configurations of elements with relatively few and easily made adjustments.

In machine tools capable of handling small work pieces with cylindrically-shaped portions, particular difficulty has been experienced in accurately centering the small piece in its proper orientation, and accordingly another object of the invention is to clamp the work piece accurately in centered position by affording a mechanism which moves a pair of clamping jaws simultaneously toward one another at the same rate so that the work piece is centered between the clamping jaws.

With work pieces having a hollow cylindrical portion, a problem exists in holding the work piece without damaging the thin side walls of the cylindrical member while maintaining the necessary holding or clamping pressure thereon during the entailed machining operation. Therefore, another object of the present invention is to provide an equalizing gripping means at the working station for gripping the hollow cylindrical articles while a clamping force is applied to the rear surface thereof to clamp the article during a machining operation.

It is common practice, with automatic machine tools, to which the present invention relates, to have operatively connected thereto a vibratory hopper wherein work pieces are placed in random fashion. The vibratory hopper orients the work pieces and delivers the work pieces in certain fashion to the machine tool. Vibratory hoppers of one rotation are needed where the head of the work piece is relatively heavy compared to the shank of the work piece, and a vibratory hopper of the opposite rotation is needed for work pieces of heavy shanks and light head portions. With prior art feeder mechanisms, it was necessary to rearrange the machine tools and provide separate feeding magazines for each of the respectively different rotational hoppers. An object of the present invention is a machine tool having the facility to support vibratory hoppers of either rotation and to employ a common magazine adapted to accommodate changes in size and configuration of the work piece that necessitate different vibratory hoppers.

Heretofore, the magazine or feeding means for the feeding of the work pieces to the workstation had a long radius or large curved guide leading to a vibratory hopper. The curved guide carried the work pieces through a 90° transition from a generally horizontal vibratory hopper to the generally vertical workholder at the workstation. These prior art guiding means employed large radius elements which were difficult to make adjustable and usually were not adjustable so as to accommodate a large number of different configurations and sizes of work pieces. Accordingly, another object of the present invention is a new and improved guide capable of being readily adjusted to accept a large number of different sizes and configurations of work pieces and to guide these work pieces from a generally horizontal hopper to a generally vertical magazine.

The large radius or large curved guides of the prior art afforded a long, slowly curving path having less resistance to downward movement under the force of gravity than do smaller radius and faster curving guides. Accordingly, a further object of the invention is to vibrate these smaller radius curved guides to assist movement of the work pieces about the curved guide to the vertically oriented magazine. A more specific object of the invention is to mount a curved guide on a vibratory hopper to vibrate the guide and thereby the work pieces to an aligned and separate work piece guide leading to the workstation.

A further object of the invention is to feed a work piece positively into position at a workstation under circumstances where such positioning is accompanied by removal of machining chips from the workstation.

In positioning work pieces in prior art devices, it is customary to engage one side of a work piece and move the work piece against a fixed reference stop or surface. With such positioning, any variation in size of the work piece between these sides thereof results in displacement of the point on the work piece which should be engaged by a tool, such displacement being equal to the variation in size. Accordingly, a further object of the invention is a new and improved workholder capable of centering a work piece between two movable members each engaging opposite sides of the work piece to center the work piece therebetween and thereby to halve any variation in size, if any, between the sides of the work piece.

Another object of the invention is to clamp or hold various sizes and configurations of work pieces at a workstation by selectively sized and configured clamping studs or elements securable to a piston rod of a fluid operated cylinder thereby eliminating the need for adjustment of the stroke of a piston rod or of the location of the cylinder and piston.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 3 is a plan view showing the location of the fluid cylinders for operating the feeding and clamping mechanisms of the present invention;

FIG. 4 is a sectional and side view showing a work piece in position at the workstation;

FIG. 5 is a front view of the machine tool constructed in accordance with the preferred embodiment of the invention;

FIG. 6 is a plan view taken in section through the magazine;

FIG. 7 is a sectional view of another embodiment of clamping jaws and a back clamp stud in accordance with the present invention;

FIG. 8 is a schematic view of the work clamping mechanism;

FIG. 9 is a perspective view of the support for the vibratory hopper;

FIG. 10 is an enlarged view of the hopper and curved guide means affixed thereto;

FIG. 11 is an end view taken along the line 11—11 of FIG. 10; and

FIG. 12 is a plan view of the hopper and curved guide means.

Figure 1:
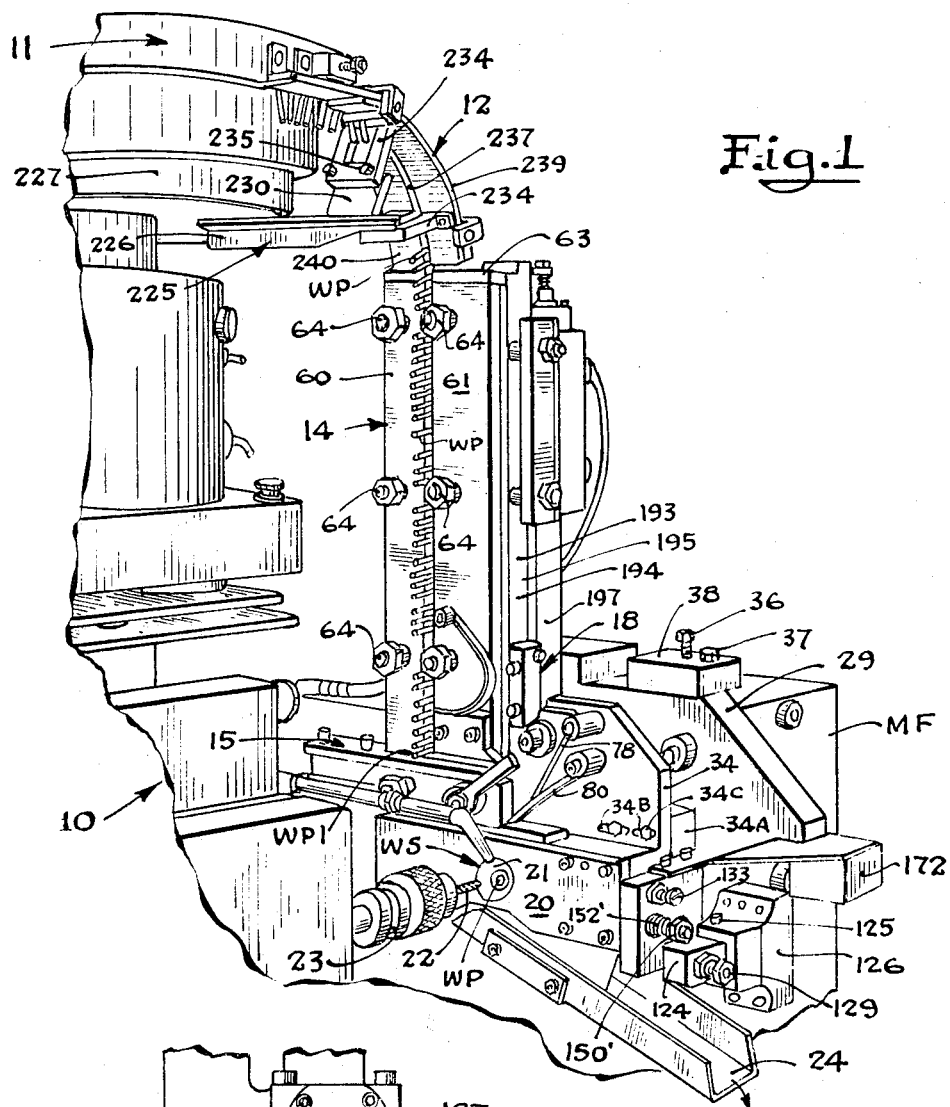
FIG. 1 is a perspective view of the machine tool for automatically feeding a work piece and holding the work piece at a workstation in accordance with the present invention.

Referring now to the drawings, and more particularly to FIG. 1, there is illustrated a machine tool 10 constructed in accordance with the preferred embodiment of the invention. The machine tool 10 includes a vibratory type of conventional hopper 11 in an elevated position and arranged to feed a plurality of work pieces WP downwardly over an arcuate and slotted guide chute 12 to a vertically oriented magazine 14 for the work pieces WP.

The work pieces WP are arranged in a vertical stack one upon another in the magazine 14, and in timed relationship the lowermost work piece WP1 is fed at right angles outward from the bottom of the stack in the magazine 14 by a reciprocatory blade or pusher 15, and is positioned beneath a transfer pusher 18, which moves in a vertical path at one side of the magazine 14. The vertical pusher 18 operates in timed relationship to drive the work piece WP1 downwardly into a workstation WS. At the workstation WS there is a front plate 20 having an aperture 21 to receive the tool 22 mounted on a spindle 23 of the machine 10.

During the machining operation, the spindle 23 moves rightwardly, FIG. 1, to insert the tool 22 through the opening 21 in the front plate 20 and into engagement with the work piece WP at the workstation WS. After the machining operation, the tool 22 is returned to the position shown in FIG. 1, and a new cycle is begun. Operation of the transfer pusher 18 to drive the next succeeding work piece WP1 into position also causes the previously machined work piece to be ejected downwardly from the workstation WS and into a downwardly inclined trough 24.

An important aspect of the present invention is the ability to readily adjust the position of the magazine 14 and the position of the entire workstation WS relative to the spindle 23. The high degree of flexibility in handling small work pieces and of ready and accurate alignment of these work pieces with the spindle and tool 22 results in less set-up time and lower cost of machining. The workstation WS and the magazine 14 are supported on a main bolster or fixture plate 29, FIG. 4, which is adapted to be moved both vertically and horizontally relative to the spindle 23 and tool 22 on the machine frame. The magazine 14 is attached to the bolster plate 29 by an angle-shaped bracket 30, FIG. 4. More specifically, a downwardly extending leg 31 of the angle-shaped bracket 30 is secured to a rear plate 32, FIG. 4, of the magazine 14 and a rearwardly extending leg 35 of the angle-shaped bracket 30 is secured to the top surface of the bolster 29 by a cap screw 48 threaded into the bolster 29. Thus, the magazine 14 is secured to the bolster 29 and its position relative to the tool 22 is adjusted with movement of the bolster plate 29.

The bolster plate 29 has its rear surface abutted against a plate 26 of a rectangular shaped box mount BM which is rigidly secured to the main frame of the machine tool. For the purpose of moving the bolster plate 29 in a horizontal direction relative to the main frame and box mount BM, a rearwardly extending block 27, FIGS. 6 and 8, is fixedly secured to the bolster plate 29 and a pair of push-pull screws 31 and 33 extending at right angles to the block 27 are for pushing and pulling the bolster plate 29 relative to the box mount BM. In a familiar manner, the screw 31 is threaded in the block 27 and has its end engaging the box mount BM. Thus, the screw 31 may be turned to push the mounting plate leftwardly as viewed in FIG. 6. To pull the bolster plate 29 rightwardly, the pull screw 33, extending through an opening in the block 27 and threaded in the bolster, is turned to pull the bolster 29 therewith.

For the purpose of moving the bolster plate 29 vertically relative to the box mount BM, push and pull screws 36 and 37, FIG. 1, are associated with a block 38 fastened to the upper surface of the bolster plate 29. The push screw 36 is threaded in the block 38 and has its end engaging the upper surface of the box mount BM so that with turning of the screw 36, the bolster plate may be forced vertically upward. To move the bolster plate 29 downwardly the pull screw 37 is turned further into the box mount BM in which it is threaded.

In addition to being able to move the bolster plate vertically and leftwardly and rightwardly as viewed in FIG. 1, it is also an attribute of the present invention that the bolster plate can be moved fore and aft relative to the spindle 23 and tool 22. As best seen in FIG. 9, the box mount BM is mounted on a slideway S formed on the main frame of the machine and as seen in FIG. 8 a tightening screw 39 engaged in the groove within the slideway S serves to lock the box mount BM in its adjusted fore and aft position.

Often a change in size or configuration of the work piece necessitates relative movement between the magazine 14 and the bolster plate 29. The magazine 14 is held in a locked position by cap screw 48, FIG. 4, extending through leg 35 of angle bracket 30 and threaded into the bolster plate at 50.

The cap screw 48 extends through an elongated slot 51, FIG. 6, formed in the angle bracket 30. The cap screw 48 extends through an aperture in a plate 46, FIG. 6, overlying the leg 35 of the angle bracket 30. This plate 46 is secured to the bolster plate 29 by cap screws 49.

For the purpose of pushing the magazine 14 leftwardly, FIG. 4, a screw 40, FIGS. 4 and 6, is threaded on a horizontal axis through the plate 41 with the end of the screw 40 bearing against the rear vertical surface 44 of horizontal leg 35 of angle bracket 30. Thus, turning of the screw 40 in the plate 41 forces the angle bracket 30 leftwardly, FIG. 4, to move the attached leg 35 of bracket 30 leftwardly across the upper surface of the bolster plate 29. The angle bracket 30 is limited in this movement by the length of the elongated slot 51 therein through which extends the cap screw 48.

To pull the magazine 14 and bracket 30 rightwardly as viewed in FIG. 4, a pull screw 47 extends through an oversized opening in the plate 41 and is threaded at 45 in leg 35 of the bracket 30 so that by turning the screw 47 the leg 35 is pulled rightwardly relative to plates 41 and 46.

To locate the magazine 14 in a given position, the locking bolt 48 extending downwardly through openings in plate 46 and leg 35 of the bracket 30 is tightened into its threaded opening 50 in the bolster 29, FIG. 4. The locking bolt 48 extends through an elongated slot or opening 51 in the leg 35 of the bracket 30 so that the bracket 30 can be moved relative to the locking bolt 48 until the locking bolt 48 is tightened. Thus, after movement of bracket 30 and magazine 14 by turning one of the pushing or pulling screws 40 or 47, the locking pin 48 is tightened to clamp the magazine 14 in its adjusted position.

The magazine 14 has a pair of vertical guide plates or rails 60 and 61, FIGS. 1 and 5 horizontally spaced from one another to provide a guide channel 62 between their adjacent edges to receive the cylindrical shaft portion of a headed work piece WP. The guide rails 60 and 61 are secured to the vertical plate 32 by a plurality of screw assemblies 64 having an outer screw and an inner socket cap screw. The guide rail 60 is adjustable so that the guide channel 62 can be varied in width to provide a complementary sized opening for the thickness of the work piece being moved through the guide channel 62. To this end, the guide rail 60 is formed with elongated slots 65, FIG. 5, inclined upwardly at an oblique angle so that, after loosening the screws 64, the guide rail 60 can be shifted simultaneously vertically and horizontally. The guide rails 60 and 61 are moved fore and aft relative to the back plate 32 by turning the outer screws which are threaded in side plates 60 and 61. The inner socket cap screws are threaded in the plate 32 and lock the outer screws and guide rails 60 and 61 in position. Thus, the space can be adjusted for receiving different thicknesses as well as different diameters of heads of work pieces.

The guide plate 61 is shifted vertically upon loosening its respective screw assembly 64, FIG. 5, and elongated vertically oriented slots 66 formed therein allow the lower edge 67 of the slide 61 to be adjusted vertically to define the width of a cross or horizontal guide channel 68, the lower edge of the channel 68 being an upper edge 69 of a front guide plate 70.

The front plate 70, FIG. 5, is secured by cap screws 72 to the plate 32. The cap screws 72 are disposed within elongated, horizontal slots 73 formed in the plate 70 so that the guide plate 70 can be moved leftwardly or rightwardly along a horizontal path, FIG. 5, to vary the width of a vertical guide slot or channel 74 at the right hand end of the plate 70 as viewed in FIG. 5. The channel 74 is afforded by the right hand end 75 of the plate 70 and an adjacent guide surface 76 of a vertically disposed, spring biased pawl guide 78.

The pawl guide 78 is mounted for swinging movement on a horizontal pivot pin 79, and is biased by a leaf spring 80 in a clockwise direction, FIG. 5, about the pivot pin 79, to bring the upper right hand rear surface 83 of the pawl guide 78 into engagement with an eccentrically mounted stop element 84 for the pawl guide 78. The stop element is held fixed in an adjusted position by a screw 85, and it will be appreciated that by loosening screw 85 the eccentric 84 can be turned to so position the guide surface 76 of the pawl guide 78 to either increase or decrease the transfer guide slot 74.

The pawl guide 78 is secured by the pivot pin 79 to a support plate 34, FIGS. 1 and 5, extending vertically and in spaced relationship to the bolster plate 29. A spacing and mounting block 34A, FIG. 1, is interposed between the support plate 34 and the bolster 29. Elongated slots 34B in the support plate 34 receive the cap screws 34C which are threaded in the spacing block 34A which in turn is secured to the bolster thereby securing the support plate 34 and spacing block 34A to the bolster 29. When it is desired to change the width of the groove 74 between the pawl 78 and the vertical end 75 of the side plate 70 to accommodate a change in the diameter of the work piece WP, the cap screws 34C are loosened and the support plate 34 is shifted horizontally within the limits afforded by the length of the slots 34B. The shifting of support plate serves as the rough adjustment for changing the size of the slot 74 and the turning of the eccentric 84 to pivot the pawl guide 78 serves as the fine adjustment for the slot 74.

As described hereinbefore, the work pieces WP move downwardly in the magazine 14 between the guide plates 60 and 61 to engage the top surface 69 of the guide plate 70, whereupon in timed relationship the pusher 15 moves rightwardly, FIG. 5, to move the lowest one of the stacked work pieces WP to engage a recessed edge 88, FIG. 5, of the pawl guide 78. After this occurs, a vertically operable transfer blade 90, FIG. 5, moved by the slide 18, moves downwardly to force the work piece WP downward in the guide slot 74 and into the mouth 92 at the workstation between a pair of opposed clamping jaws 95 and 96.

Because of the recessed area 88 on the guide pawl 78 and the adjustment of the eccentrically mounted stop 84, the guide slot 74 has a dimension slightly under that of the work piece to be moved therethrough so that as the work piece is forced downwardly through the guide slot 74 by the transfer slide 90, the work piece forces the pawl guide 78 to pivot in a counterclockwise direction. Thus, the spring biased pawl will assure that the work piece WP will be guided by continuous engagement with the guide surface 75 of the guide channel 74 until the work piece enters the mouth 92 of the clamping jaws or blocks 95 and 96.

The clamping jaws or blocks 95 and 96 are beveled at their upper edges at the mouth 92 and have tapering surfaces 97 and 98, FIG. 5, inclined toward each other for guiding the work piece to suitably shaped clamping surfaces 99 and 100 by which the work piece WP is gripped for a machining operation.

An important aspect of the present invention is the way in which the work piece WP is held and centered prior to a final holding or clamping operation. Under the present invention, the clamping jaws 95 and 96 are moved simultaneously toward one another to produce self-centering of the work piece and to exert holding or clamping forces on the sides of cylindrical surfaces of the work piece WP. Because the work piece WP in many instances has a hollow and thin walled cylindrical portion, the side clamping pressure is relatively light as compared with the back clamping pressure afforded by a back-up support in the form of a stud 105, FIG. 4.

The clamping force for centering and clamping the work piece by the jaws 95 and 96 is generated by a fluid operating cylinder 110, FIGS. 5 and 8, which forces its piston 111 rightwardly, as viewed in FIGS. 5 and 8, into engagement with a surface 112 of a plate 113. The plate 113 is secured to a slide block 115 disposed between the jaw 96 and the plate 113 so that movement of the plate 113 rightwardly by the piston 111 is accompanied by movement of the clamping jaw 96 rightwardly. In order to move the opposite clamping jaw 95 leftwardly at the same time as the clamping jaw 96, and at the same rate of movement, so as to provide the self-centering movement of the clamping jaws 95 and 96, there is provided a self-centering motion transfer mechanism which includes a slideable bar 118, FIGS. 5 and 6, disposed to slide in spaced L-shaped brackets 119, FIG. 4, secured to the bolster 29 by cap screws 117.

The transfer bar 118 has its left hand end 120, FIGS. 5 and 8, in engagement with the plate 113, and has its right hand end 121, FIG. 6, in engagement with a stop member 122. The stop member 122 is threaded in a motion transfer lever 124 which is pivoted on a pin 125, FIG. 6, of a block 126 fixed to the bolster plate 29. The motion transfer lever 124 has at its forward end an adjustable screw 129, which has a lock nut 130 to secure the screw 129 in a given rotative position. The end 131 of the screw 129 is in engagement with an actuating plate 132 which is secured by screws (not shown) to a slide block 135, FIGS. 6 and 8. The slide block 135 has the clamping jaw 95 secured thereto by fasteners 144, FIGS. 1 and 7.

The manner of supporting the slide blocks 115 and 135, which carry the respective clamping jaws 95 and 96, is best explained in conjunction with FIGS. 5, 7 and 8. As seen in FIGS. 5 and 7, spaced guiding blocks 138 and 139 respectively extend from the rear surface of the front plate 20 to bolster plate 29 and are secured by fasteners 140, FIG. 5, to the bolster plate 29. The blocks 138 and 139 have a rectangular groove 143, FIG. 7, therein, at the front portions thereof in which slide the slide blocks 115 and 135. As best seen in FIGS. 4 and 5, the slide block 96 slides on the lower guiding surface 143S of the groove 143.

The clamping jaws 95 and 96 are clamped to their respective slide blocks 135 and 115 by cap screws 144, FIG. 5, so as to move directly with these slide blocks in response to operation of the fluid operable cylinder 110.

Recapitulating, operation of the fluid cylinder 110 moves the piston 111 rightwardly into engagement with the surface 112 of the plate 113. The piston 111 is able to force the plate 113 in its attached slide block 115 rightwardly to begin to move the clamping jaw 96 secured thereto by cap screws 144 towards a center line CL, FIG. 5, for the work piece WP. The lower portion of the plate 113 is in engagement with the leftward end 120 of the transfer bar 118, and the transfer bar 118 moves with the plate 113, slide block 115, and clamping jaw 96.

The right end 121, FIG. 6, of the transfer bar 118 pivots the motion transfer leftward 124 to swing its forward portion containing the screw 129 leftwardly to bear against the plate 132. This forces the plate 132 and attached slide block 135 leftwardly to push the clamping block 95 toward the clamping block 96.

The length of the lever 124 is such that the screw 129 moves the same proportionate distance as the screw 122 at the rearward end of the lever 124 moves. Stated differently, the lever 124 is adapted to provide a one-for-one transfer or motion from one direction to an equal amount of motion in the opposite direction. Thus, it will be apparent that the clamps 95 and 96 are moving toward each other with the same rate of movement and moving through the same distance to center therebetween the work piece on the center line CL.

The slide blocks 135 and 115 are spring biased to hold the jaws 95 and 96 in their clamping positions, as will be explained in detail hereinafter. Therefore, when the succeeding work piece WP1 is pushed into the slot between the incline planes 97 and 98 on the clamping jaws 95 and 96, the clamping jaws 95 and 96 move against the bias for sufficient spread at the lower edges 145, FIG. 5, of the arcuate clamping surfaces 99 and 100 to release the work piece WP to drop into the eject chute 24, FIG. 1. The lower edges 145 of the clamping surface 99 and 100 define an opening which is of wider dimensions than the entrance into the arcuate surfaces 99 and 100. That is to say, that space between the inclined surfaces 97 and 98 at the arcuate clamping portions 99 and 100 is of a smaller dimension than the spacing between the lower edges 145 immediately therebelow. Preferably, the spacing between the inclined surfaces 97 and 98 leading to the arcuate clamping portions 99 and 100 is such that the lowermost workpiece WP is dropped or released when the head portion of the upper work piece WP1 is 1/32 of an inch from the head portion of the lower work piece WP. Thus, the head portions of the work pieces WP and WP1 do not come into contact which might cause the canting of the work pieces WP and WP1 between the jaws 95 and 96.

The movement of the slide blocks 115 and 135 toward one another is limited by engagement of a stop screw 161, FIG. 5, with the left side surface 162 of the front plate 20 and by engagement of screw 133 with the right side surface of the front plate 20. The slide blocks 115 and 135 are biased toward one another to engage their respective stops 161 and 133 with the side edges of the front plate 20 by comprison springs 150 and 150', FIG. 5, mounted on studs 152 and 152'. The studs 152 and 152' are threaded into the left and right sides of the front plate 20, respectively, and extend through apertures in the respective plates 112 and 132. The outer portions of the apertures in the plates 112 and 132 are enlarged to afford a spring seat for the respective compression spring 150 and 150' which are compressed between the seats and the heads of the respective studs 150 and 150'. Since the studs 150 and 150' are threaded into a non-movable front plate 20, their respective compression springs 150 and 150' act against the seats of the respective plates 112 and 132 to force the plates 112 and 132 toward one another and thereby in turn urge the side blocks 115 and 135 toward one another to clamp under spring pressure a work piece between the jaws 95 and 96.

The motion transfer lever 124 is urged to rotate to contact the end 121 of the transfer bar 118 by a compression spring 155 disposed within the housing 126, FIG. 6.

In the hereinbefore described operation of the clamping jaws 95 and 96, the clamping jaws and slide blocks were disposed so that the holding surfaces 99 and 100 were disposed equidistantly from the center line CL in both the biased clamping position and in the positive holding position under the cylinder pressure 110. However, there may be occasions when it is desired to machine work pieces in an off-center location, and the present invention is readily adapted to permit the off-center locating of the work piece. For example, it may be desired to drill a hole in the cylindrical portion of the work piece offset from the center or axis of the cylinder. This is accomplished by adjusting one of slides 135 or 115 and its associated clamping jaw 95 and 96 in a position to the right or to the left of the position shown and described hereinbefore. That is to say if one of the clamping jaws 95 or 96 is moved to a position closer to the center line CL than the other clamping jaw 95 or 96, then the equidistant movements of both clamping jaws results in the clamping jaws being offset to the center line CL.

For this purpose, the clamping jaw 96 can be moved relative to its centered position by turning stop screw 133, which bears against the left side of the front plate 20. Turning of screw 133 causes the slide block 135 to move relative to the front plate 20 either rightwardly or leftwardly. The adjusting screw 129 on the lever 124 should also be adjusted to be just contacting the plate 132 after having adjusted the spacing between the plate 132 and slide block 135. Similarly, the spacing or relative positions between the plate 113 and the slide block 113 can be adjusted by turning stop screw 161 which bears against the right side of front plate 20.

The movement of the clamping jaws 95 and 96 through a predetermined distance results in operation of the back clamp 105. Thus, the back clamp 105 will not be effective if the clamping jaws 95 and 96 are prevented from moving to the clamping position, as for instance, by the misalignment of a work piece coming into the clamping jaws 95 and 96. Thus, the chance of damage to the workstation by the back clamp 106 engaging a misaligned work piece is lessened. The back clamp cylinder 108 is under the control of a microswitch 172, FIGS. 1 and 8, having an arm 173 extending into engagement with an actuating button on the transfer bar 118. When the transfer bar 118 moves rightwardly, FIG. 8, to bring the clamping jaws 95 and 96 closer together, the arm 173 is actuated to close the microswitch 172. Closing of microswitch 172 causes the cylinder 108 to move its clamping piston rod 106 forwardly, as viewed in FIG. 4, to bring the stud 105 against the rear surface of the head H of a work piece and thereby clamp the head H against the rear surface 109 of the jaws 95 and 96. The back clamp piston rod 106 actuates a microswitch 174, FIG. 8, during its forward stroke to start the spindle cycle to bring the cutting tool 22 into engagement with the end E of the work piece WP1. More specifically, a sensing lever 170 extends through an opening in the bolster plate to engage the end of a lever 171 which is pivoted to close the microswitch 174 with the forward movement of the back clamp 106.

Preferably, the amount of clamping force afforded by the back clamp stud 105 is approximately seven times the force afforded by the side clamps 95 and 96. As best seen in FIG. 4, the stud 105 is fastened by set screw 175 to the piston rod 106 so that after loosening the set screw 175 the stud 105 can be removed to enable a stud of different proportions to be substituted, thereby adapting the machine for work pieces of different thickness and/or head size. In this manner, the present invention is particularly adapted to provide large flexibility in holding the work piece from the rear by affording a change in studs as 105 rather than by a cumbersome adjustment of the piston stroke of the fluid cylinder 108.

After the machining operation on the work piece WP1, the spindle moves away from the workstation WS and work piece WP and pulses the cylinder 110 to retract the piston 111 for the clamping jaws 95 and 96 and pulses the cylinder 108 to retract the back clamp stud 105 away from the head H of the work piece WP. The machine then commences a new operational cycle for the next work piece WP1 by pulsing the slide transfer cylinder 176, FIG. 5, which actuates the horizontal cross slide 15 to force the work piece WP1 from the bottom of the stack and to move the work piece WP1 across the horizontal guide surfaces 67 and 69 to a position beneath the vertical transfer slide 90.

The cylinder 176, FIG. 5, is secured to the reverse side of a mounting plate 177, which has therein an opening 180 in which is reciprocated a slide block 181 on which is secured the horizontal transfer slide 15. The slide block 181 reciprocates in the opening 180 and is attached by a clamping bolt 182, FIG. 6, to the piston 183 for the cylinder 176. Thus, as the piston rod 183 moves rightwardly, as viewed in FIG. 6, the slide block 181 moves in the opening 180 and inserts the transfer slide pusher 15 through the guideway 68 to move the work piece WP1 rightwardly to a position against the recessed area 88 of the guide pawl 78.

As viewed in FIG. 6, the rightward movement of the piston 183 is limited by the engagement of the leading edge 185 of the piston engaging a stop screw 186 secured to the bolster plate 29 of the machine. The stop screw 186 is adjustable so as to render the amount of movement of the piston 183 variable, depending on the size of the work piece WP.

With the work piece WP1, FIG. 5, against the guide pawl 78, the actuating cylinder 187, FIG. 4, for the vertical pusher 90 is actuated to drive the vertical pusher 90 downwardly to force the work piece WP1 through the guide slot 74 into the mouth 92 leading to the workstation WS. The actuating cylinder 187 for the vertical pusher 90 is secured by a number of cap screws 188 to the main vertical magazine back plate 32. The cylinder 187 drives a piston rod 190 which is attached by a bolt and nut fastener 191 to the slide block 18.

As best seen in FIG. 5, the upper portion of the vertical pusher 90 is secured by fasteners 192 flat against the side of the pusher block 18 to reciprocate therewith. The slide block 118 slides in an open vertical slot 194, FIGS. 1 and 5, defined between an edge 195 of a plate 193 and an edge 196 of an outer guide bar 197. As best seen in FIG. 6, the slide block 18 is disposed to extend rearwardly of the blade 90 to ride against the forward surface 199 of the outer guide bar 197. Thus, the guide bar 90 is guided and held for reciprocating movement in response to actuation of the cylinder 187.

The piston rod 190 for the cylinder 187 moves downwardly until its leading edge 201 engages the top of a stop screw 202, FIG. 4, secured in the arm 35 of the bracket 30. The stop screw 202 is threaded for adjustment and can be locked in any one of a number of positions to limit the downward movement of the piston 190. As seen in FIG. 4, the vertical blade 90 has a forward portion 210 disposed immediately above the work piece WP1 and has a recess 211 which is adapted to receive the head H of the work piece WP1.

The vertical blade 90 also has a leading finger 212 which is adapted to move downwardly behind the movable jaws 96 and 97 to clear out chips left from previous drilling or tapping machining operations. Thus, the vertical blade 90 performs the dual functions of removing chips from the clamping jaws 95 and 96 by the finger 212, and transferring a work piece such as WP1 into the working station between the jaws 95 and 96.

In the embodiment of the invention shown in FIG. 7, back clamp stud 105A on piston rod 106A has an elongated slot 220 extending vertically through said stud and extending rearward from its forward edge 221. The slot 220 permits the finger 212 of the vertical plate 90 to be moved downwardly therethrough. Thus, the leading finger 212 is adapted to move through the stud 105A and remove any chips from the recess 222 between the respective clamping jaws 95A and 96A. The clamping jaws 95A and 96A have recessed cut outs 222 to permit the stud 105A to move forwardly to engage the head of the work piece (not shown) which head will be in a seat 230.

The clamping jaws 95A and 96A are similar to the clamping jaws 95 and 96 except that jaws 95A and 96A have been recessed at 222 to provide for a much shorter work piece, which would have a very small shank of approximately the length afforded by arcuate side walls 99A and 100A. Thus, clamping jaws 95 and 96 or 95A and 96A or other suitable clamping jaws having different configurations for the clamping surfaces 99 and 100 can be afforded for a large variety of shapes of work pieces which can be employed in the present machine tool. Furthermore, the clamping walls 99 and 100 need not be arcuate but may be of a general V-shape configuration to take various sizes and configurations of work pieces. To change the clamping blocks, it is merely necessary to remove the front plate 20 and loosen the cap screws 144 which hold the respective clamping jaws 96 and 95 on their sliding blocks 115 and 135.

It will be recalled that the vibratory hopper 11 was previously described as capable of being mounted either on the left- or right-hand side of the machine. The position of the vibratory hopper 11 is determined by the configuration of the work piece, that is, whether or not the work piece has a heavier shank or a heavier head portion. In the embodiment of the invention shown and described herein the work pieces have a long and heavier shank portion and are vibrated downwardly over the curved guide means or chute 12 to the magazine 14.

Heretofore considerable difficulty was experienced in affording flexibility in handling work pieces of different sizes and configurations by the same curved guide and magazine to the workstation. The prior art practice consisted of a large radius and slowly curved guide means which was customized or tailored to the particular work piece being fed. More particularly the prior art guide was affixed to the machine adjacent the workstation and extended in one long continuous curve to the vibratory hopper.

In the present invention a long vertical magazine 14 and a separate guide 12 are employed. The radius of the curved guide 12 of the present invention is considerably smaller and is faster in curving. The curved guide 12 is secured by a bracket 225 to the vibratory hopper 11 for being vibrated while delivering work pieces over the radius of curvature and into the vertically oriented magazine 14. By vibrating the curved guide 12 the work pieces are vibrated about the radius and vibrated into the position wherein they are fed into the magazine 14. Without such vibration work pieces would not of themselves slide readily about the short radius guide 12 under the force of gravity as in the prior art guides.

The primary advantage in the short radius guide 12 is that the guide lends itself to ready adjustment to accommodate various sizes and shanks and heads and thereby has the flexibility needed for cooperation with the adjustable magazine 14 and clamping and holding apparatus hereinbefore described.

A work piece guide 12 is supported on the vibratory hopper 11 by a bracket 225, FIG. 1.

The bracket 225 includes an angle member 226, FIG. 10, secured to the under surface of the hopper bowl 227.

As best seen in FIGS. 1 and 10 a pair of obliquely oriented spacer plates 230 and 231 are welded to the respective sides of the angle 226. The oblique spacer plates 230 and 231 each support a U-shaped holder 234 secured to the spacer plates by cap screws 235.

As best seen in FIG. 1, the shank of the work piece WP extends downwardly through an open space or groove 237 between a pair of curved guide plates 239 and 240. The curved guide 239 is secured to the ends of the legs of the U-shaped members 234 by cap screws 242 and 243, FIGS. 10 and 12.

The curved guide 239 has elongated slots 244 and 245, FIG. 12, which extend normal to the path of travel of the work piece through slot 237 and through which slots 244 and 245 extend the respective screw fasteners 242 and 243. Thus, the curved guide 239 can be moved relative to the curved guide 244 to adjust the size of the opening 237 within the limits afforded by the elongated slots 244 and 245. In a similar manner, the curved guide 240 is secured by threaded fasteners 246 and 247 to the other legs of the U-shaped brackets 234. The curved guide 240 has a pair of elongated slots 248 and 249 for receiving the respective screw fasteners 246 and 247 so that the curved guide 240 may also be moved relative to its opposite guide 239 to enlarge the slot 237 for the shank of the work pieces WP.

To properly orient and hold in position the work pieces WP, particularly at the lower discharge end of the curved guide means 12, there is provided a top or head guide 250, FIGS. 10 and 12, which guides the head portions to prevent the tumbling or loss of a work piece during movement of the work piece from the generally horizontal hopper 11 to the generally vertical magazine 14. As best seen in FIG. 10 the top guide 250 is a curved member extending upwardly above the curved guides 239 and 240 and in spaced relation thereto.

The top guide 250 is held in a spaced position by a pair of spaced angle brackets 254 and 255 which are secured by threaded fasteners 256 and 257 to the side portion 258 of the curved guide 239. Each of the angle brackets 254 and 255 have elongated slots 259 and 260 therein through which extend the respective screws 256 and 257 so that the spacing between the top guide 250 and curved guides 239 and 240 can be adjusted for the particular height of the head on the work piece. As best seen in FIG. 12 the top guide 250 is secured by screw fasteners 265 and 266 to the angle brackets 254. The angle brackets 254 and 255 have elongated slots 267 and 268 for receiving the screws 265 and 266, respectively and thereby, within the limits of these elongated slots 267 and 268 permit the movement of the top guide 250 in a direction toward and away from the bowl 227 of the hopper 11.

An adjustable adapter 270 is secured to the hopper bowl 227 to guide the work pieces WP into the inlet portion of the curved guide means 12 as best seen in FIG. 12. The work pieces WP moving around the curve track 271 are oriented with their heads in a leading direction and their shanks disposed in a generally horizontal position until they reach the forward edge 272 of the adapter 270 whereupon the shank of the work piece falls downwardly into a slot 273 formed between the two guide brackets 274 and 275. The guide brackets engage the head of the work piece and hold the work piece against falling downwardly through the slot 273. The inner guide bracket 274 has an elongated slot 276 through which extends a cap screw 277 for holding the guide bracket 274 in an adjusted position. Similarly, the outer guide bracket 275 is secured in adjusted position by cap screws 278 disposed in elongated slots 279 in a pair of angle brackets 281 and 282 secured by fasteners 283 to the rim of the bowl 227. The guide bracket 275 extends through a slot or opening in the rim wall of the bowl 227. Thus, by loosening the fasteners 278 the guide bracket 275 can be pushed further inwardly through the slot or pulled further outwardly through the slot in the bowl rim to adjust the size of the slot 273.

To stabilize the end of the guide bracket 274, an upstanding plate 285 thereon is secured by fasteners 286 to a bridging member 287 which is a portion of the rim of the bowl 227. As seen in FIG. 11 the bridging member 287 has an elongated slot 288 through which the fasteners 286 can slide with adjustment of the guide bracket 270 to vary the size of the slot 273.

As will be understood from the foregoing, the sizes of the slots 273 and 237 are adjusted for the size of the work piece and are aligned with one another to afford a continuous path for the work pieces from the hopper bowl 227 to the vertical magazine 14. Best results are achieved by reducing the clearance between the discharge end of the curved guide means 12 and the inlet or top portion of the magazine 14 so that the work pieces do not have a large free space in which to fall and re-orient themselves.

To facilitate the aligning of the discharge of the curved guide means 12 and the inlet to the magazine 14, the vibratory hopper 11 is mounted on a movable platform 295, FIG. 9, which is adapted to slide in a fore and aft direction toward the spindle 23 and tool 22. The movable platform 295 is supported on a generally vertical stand 296 having a lower roller portion 297 guided for rolling engagement along with guide rail 298. A handle 299 may be provided to tighten the clamp (not shown) on a clamping rail 300. With the guiding means 12 properly aligned over the magazine 14 the handle 299 is turned to tighten the clamp on the rail 300 to lock the stand 296 and platform 295 in position.

The following brief description of operation is intended to facilitate understanding of the present invention. As viewed in FIG. 1, the work pieces WP are disposed in the vibratory hopper 11 where the work pieces are re-oriented from random positions to a position with the cylindrical shank portions extending downwardly through the slot between the curved guide plates 239 and 240. The outlet end of slot 237 of guide means 12 is aligned immediately above the guide slot 62, FIG. 5, and with the plates 60 and 61 of the vertical work piece magazine 14. The bottom-most work piece of the stack, WP1, in the magazine, is transferred by pusher blade 15 in a horizontal direction to beneath the vertical pusher or blade 90.

To operate the transfer or horizontal blade 15, the horizontal transfer actuating fluid cylinder 176 is actuated by fluid under pressure to drive its piston 183 and attached slide block 181, which in turn is attached to the transfer pusher 15, rightwardly as viewed in FIGS. 1, 5 and 6. The piston 183 moves rightwardly until it engages the stop 186, FIG. 6, at which time the work piece WP1 will be disposed against the recess area 88, FIG. 5, of the guide pawl 78.

In timed relationship, the vertical cylinder 187 is actuated to drive its piston rod 190 downwardly. Piston 190 is attached to slide block 18 carrying the vertical blade 90, which moves downwardly into driving engagement with work piece WP1. The finger 212, FIG. 4, of the pusher 90 precedes the entry of the work piece through the opening in the button 105 to wipe and to force downwardly any accumulated chips. The vertical blade 90 moves the work piece WP1 downwardly and the edge 76 of the pawl guide 78 urges the work piece WP1 against the slide 75 of the guide channel during the downward movement of the work piece WP1 into the mouth 92 between the gripping jaws 95 and 96.

The guiding surfaces 97 and 98, respectively, of the jaws 95 and 96, are inclined toward one another in a convergent manner towards their respective gripping surfaces 99 and 100. Thus, as the vertical blade 90 forces the work piece WP1 further into the gripping jaws 95 and 96, the jaws 95 and 96 are forced to spread apart and the previous work piece WP drops from the lower portion of the jaws 95 and 96 into an eject chute 24 leading to the collecting stations for the finished work pieces.

With the new work piece disposed at the workstation WS between the clamping surfaces 99 and 100 of jaws 95 and 96 which are biased toward each other by compression springs 150, a positive side clamping operation is initiated by actuation of the clamping cylinder 110. As seen in FIG. 8, the cylinder 110 drives its piston 111 rightwardly to engage the surface 112 of a plate 113 connected to the slide block 115 carrying the left clamping jaw 96.

The plate 113 against which the piston 111 is engaged also bears against the leftward end 120 of a horizontally disposed transfer bar 118 which has its opposite end 121, FIG. 6, disposed against a rearward end of a one-for-one motion transfer lever 124. The forward end of the motion transfer lever 124 has an actuating screw 129 with its tip 131 bearing against a pusher plate 132 on which is secured the right-hand clamping jaw 95. Thus, as the left-hand clamping jaw 96 moves, there is an accompanying equal movement of the right-hand clamping jaw 95 so that the work piece WP1 is being centered as it is being clamped by the jaws 95 and 96. The clamping pressure afforded by the clamping jaws 95 and 96 is limited to a predetermined extent so that the clamping pressure will not damage any hollow or thin-walled cylindrical members due to excessive side clamping pressures.

Rightward movement of the transfer rod 118, FIG. 8, actuates rod 173 to close microswitch 172 to begin a back clamping operation by the stud 105. Mircroswitch 172 causes actuation of the cylinder 108 to move its piston rod 106 leftwardly, as viewed in FIG. 4, to bring stud 105 against the rear surface of the head H of the work piece WP. The stud 105 forces the head H against the rear surfaces 109 of the respective clamping jaws 95 and 96 and exerts sufficient pressure thereon to hold the work piece. The back clamp stud 105 rotates a lever to actuate a rod 170 to close microswitch 174 to initiate the moving of the spindle and insertion of the tool 22 through the opening in the front plate 20 to perform the machining operation.

After the machining operation, the spindle 23 returns the tool 22 from the opening 21 in the front plate 20, and the operation of the transfer cylinder 176 is initiated to begin the next feeding and machining cycle of operation.

Figure 2:
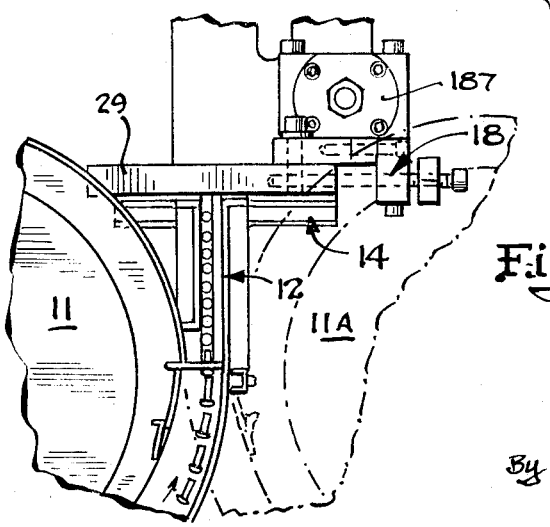
FIG. 2 is a plan view of alternative right or left hand feed hoppers for the machine tool in accordance with the present invention.

An important aspect of the present invention is its flexibility and adaptability to accommodte different shapes and sizes of work pieces. Thus, with the long shank work pieces, as illustrated in the drawings, the hopper 11 is a counterclockwise hopper, FIG. 2, whereas an alternate hopper 11A, as shown in FIG. 2, as being a clockwise hopper, which could feed large-headed elements to the magazine 14. The hoppers are carried on a slideable carriage such as shown in FIG. 9 so that merely by moving the carriage relative to the magazine 14, a clockwise or counterclockwise hopper can be aligned in a ready manner with the magazine 14.

To accommodate larger or smaller size articles, the hopper 11 has adjustable guiding plates 270 and 274 leading to a guide channel in the guide means 12 which is also adjustable. Similarly, the magazine 14 has an adjustable guide channel. The size of the transverse guide slot 63 is readily changed by moving the guide plate 61 vertically along the elongated slots 66 and then tightening the cap screw 64. The guide slot 74 through which reciprocates the vertical pusher 90 is adjusted by loosening the cap screws for the plate 70 and moving it rightwardly or leftwardly along its elongated slots 73 and/or by turning the eccentric 84 so as to move the pawl guide 78 clockwise or counterclockwise. The pawl guide 78 is locked in position by tightening cap screw for the eccentric 84.

The amount of movement of the clamping jaws 95 and 96 toward one another and thereby the spacing between the accurate holding surfaces 99 and 100 on the clamping jaws 95 and 96 can be varied by turning the adjusting screws 161 and 133, which determine the relationship between the respective slide blocks 115 and 135 and their respective pushing plates 113 and 132 to prevent crushing of parts and clamping of tools on their walled parts.

If it is desired to have the centering operation performed on a non-syymetrical basis (that is, the work piece is oriented and clamped and held so as to be machined not in the center of the work piece but on an axis displaced either rightwardly or leftwardly from the center of the work piece) the screw 129 is turned to move the plate 132 and sliding clamping jaw 95 either to the left or to the right. Thus, with the continued equal movements of the plates 132 and 113, the centering of the jaws 95 and 96 will find the jaw 95 displaced either rightwardly or leftwardly of the position it would assume if it had not been adjusted by the screw 129.

To accommodate the different size heads H or the lack of a head on different work pieces, the present invention employs a replaceable stud 105 which is secured by a set screw 175 to the clamping piston rod 106. By changing the size and shape of the stud, the back clamping pressure and stroke can be maintained for changes in length of work piece or thickness of head without changing the stroke of the cylinder 106, which would be a more cumbersome operation.

If necessary, the clamping jaws 95 and 96 can be changed to give a different configuration of holding surfaces 99 and 100 for shapes of work pieces not suited to being clamped by the generally semi-circular holding surfaces 99 and 100. The clamping jaws 95 and 96 are replaced by loosening cap screws 144 for the respective slide blocks 115 and 135 and attaching new clamping jaws to the respective slide blocks. Moreover, the clamping surfaces 99 and 100 need not be arcuate and, in some instances, V-shaped configurations are employed to accommodate a number of varying sizes of diameters of work pieces. Manifestly, for work pieces of non-cylindrical or of unusual shapes the clamping surfaces 99 and 100 can be changed accordingly to accommodate the particular shape of the work piece.

In addition to the foregoing adjustments, the entire magazine 14 can be moved forwardly or rearwardly by adjusting the push-pull screws 40 and 47, FIG. 6. The entire bolster plate 29 is movable in three directions by push and pull screws to readily align the work piece with the spindle 23 and tool 22.

From the foregoing, it will be seen that the present invention is highly flexible in adjustment to accommodate various sizes and shapes of small machine elements. Also, the present invention employs a centering device for moving the work piece to a centered position by side clamps.

The side clamping pressure is adjustable to be less compared to the back clamping pressure afforded by a button 105. By changing the size and the shape of the stud 105, the piston stroke 106 can be kept constant while changes due to the thickness of the head or the size of the head can be accommodated by the changing of the button 105.

Hence, while I have illustrated and described preferred embodiments of my invention, it is to be understood that they are capable of variation and modification.

I claim:

In a machine tool capable of orienting various sizes and configurations of workpieces each having a head and a shank to be aligned at a work station with the axis of the shank in a horizontal disposition, a vibratory hopper supported in an elevated position above a work station in the machine tool and adapted to receive a supply of such workpieces, a separate vertical magazine below said hopper and having a vertical slot therein for receiving the workpieces one atop another and guiding said workpieces downward toward the work station with the axes of the workpieces each in a horizontal disposition, a separate detachable curved guide means having a downwardly curved guide slot communicating at one end with said hopper to receive workpieces fed therefrom and communicating at the other end with the vertical guide slot in said magazine to feed workpieces thereto, the slot in said guide means curving downward from said hopper along a substantially constant radius to the vertical slot in said magazine along substantially a 90° arc, said guide means being secured to said hopper for vibration therewith, whereby a workpiece moving from said hopper when vibrated into the slot in the guide means is initially aligned substantially vertically and radially in the curved guide slot and thereafter is turned through substantially 90° while descending the curved guide means in such radial disposition relative thereto and eventually aligned on a horizontal axis as it enters the vertical guide slot, the workpieces when in the hopper moving therein toward said downwardly curved guide slot along a generally circular path of given direction and entering the curved guide slot from one side of said hopper, a support detachably supporting said hopper, and movable relative to the magazine to enable an alternate hopper to be detachably supported thereby and in which workpieces move in the alternate hopper in a direction opposite said given direction.

References Cited by the Examiner
UNITED STATES PATENTS

| | | | |
|---|---|---|---|
| 2,521,209 | 9/1950 | Fether | 10—162 |
| 2,732,570 | 1/1956 | Carpenter | 10—107 |
| 2,757,391 | 8/1956 | Stottemyer | 10—107 |
| 2,811,876 | 11/1957 | Batchelder. | |
| 3,012,344 | 12/1961 | Schott | 10—155 |
| 3,109,557 | 11/1963 | Klancnik | 221—238 |
| 3,123,251 | 3/1964 | Schneider | 198—33.1 X |
| 3,150,762 | 9/1964 | Tricinci | 198—220 X |

ANDREW R. JUHASZ, *Primary Examiner.*